United States Patent
Mannes

(10) Patent No.: US 7,214,257 B2
(45) Date of Patent: May 8, 2007

(54) PLANT FOR CLEANING AND DEGASSING A FIBROUS SUSPENSION

(75) Inventor: Wolfgang Mannes, Bavendorf (DE)

(73) Assignee: Voith Paper Patent GmbH, Heidenheim (DE)

( * ) Notice: Subject to any disclaimer, the term of this patent is extended or adjusted under 35 U.S.C. 154(b) by 351 days.

(21) Appl. No.: 10/838,220

(22) Filed: May 5, 2004

(65) Prior Publication Data
US 2005/0139529 A1  Jun. 30, 2005

(30) Foreign Application Priority Data
Mar. 20, 2003  (DE) ............... 103 22 572

(51) Int. Cl.
*B01D 19/00* (2006.01)
(52) U.S. Cl. .................... 95/248; 95/261; 96/195; 96/209; 210/512.2; 209/728; 209/732
(58) Field of Classification Search .............. 95/248, 95/261; 96/195, 209; 210/512.2; 209/728, 209/732
See application file for complete search history.

(56) References Cited

U.S. PATENT DOCUMENTS

| 3,206,917 | A | * | 9/1965 | Kaiser et al. ............ 95/248 |
| 3,421,622 | A | * | 1/1969 | Wurtmann ............... 209/731 |
| 3,432,036 | A | * | 3/1969 | Kaiser ..................... 209/729 |
| 3,538,680 | A | * | 11/1970 | Kaiser ..................... 95/248 |
| 4,437,984 | A | * | 3/1984 | King et al. .............. 209/728 |
| 4,443,232 | A | | 4/1984 | Kaiser |
| 4,478,615 | A | * | 10/1984 | Kaiser ..................... 96/170 |
| 5,236,475 | A | * | 8/1993 | Evens ..................... 96/197 |
| 5,401,411 | A | | 3/1995 | Andersson |
| 2003/0015304 | A1 | | 1/2003 | Beuermann |

FOREIGN PATENT DOCUMENTS

| DE | 1761496 | 7/1971 |
| DE | 4106140 | 9/1992 |
| EP | 1273697 | 1/2003 |

* cited by examiner

*Primary Examiner*—Duane Smith
*Assistant Examiner*—Douglas J. Theisen
(74) *Attorney, Agent, or Firm*—Greenblum & Bernstein, P.L.C.

(57) ABSTRACT

Plant and process for cleaning and degassing a fibrous suspension. The plant includes a plurality of hydrocyclones, in which each hydrocyclone includes an intake connection, an accepts connection, and a rejects connection and at least two supply lines for feeding liquids into the plurality of hydrocyclones. At least two accepts lines, coupled to the accepts connections of the plurality of hydrocyclones, are structured and arranged to combine liquids cleaned of contaminants in the plurality of hydrocyclones, and at least one accepts draining pipe coupled to the at least two accepts lines is structured and arranged to open directly into a further line downstream. The instant abstract is neither intended to define the invention disclosed in this specification nor intended to limit the scope of the invention in any way.

24 Claims, 3 Drawing Sheets

PLANT FOR CLEANING AND DEGASSING A FIBROUS SUSPENSION

CROSS-REFERENCE TO RELATED APPLICATIONS

The present application claims priority under 35 U.S.C. §119 of German Patent Application No. 103 22 572.2, filed on May 20, 2003, the disclosure of which is expressly incorporated by reference herein in its entirety.

BACKGROUND OF THE INVENTION

1. Field of the Invention

The invention relates to a plant with several hydrocyclones which respectively feature an intake connection, an accepts connection, and a rejects connection for the heavy material.

2. Discussion of Background Information

As is known, hydrocyclones are used in order to fractionate liquids containing materials of different sinking behavior through strong centrifugal forces. Thus, it is possible, e.g., to concentrate contaminants contained in a fibrous suspension such as is used to produce paper and to discharge them from the hydrocyclone through a reject connection. The fraction freed from contaminants, i.e., the accepted stock, is drawn off through the accepts connection and used further. Moreover, hydrocyclone plants often also have the purpose of likewise removing at least most of the gases contained in the liquid, e.g., the air. To this end the accepted stock is placed under vacuum after leaving the hydrocyclone so that the gases emerge and can be drawn off separately. These processes are known per se, likewise the fact that a good effect is only ensured if the hydrocyclones do not exceed a certain size. With a hydrocyclone plant that is designed for larger throughput amounts, as is customary in paper factories, a plurality—often even a large number—of hydrocyclones is therefore required. These are then flowed through in a parallel manner by the liquid to be cleaned, which means that the liquid stream has to be divided into a number of smaller partial streams. To this end, e.g., distribution devices, as described below, can be used.

A plant is known from DE 41 06 140 A1 in which the accepts of a number of hydrocyclones are combined and guided into a deaeration chamber. In this they are divided through a perforated plate and then enter into a degassing volume kept under vacuum. The plant is very effective but requires a high expenditure in terms of equipment.

In other cases the pipelines that guide the accepts out of the hydrocyclones open into an accepts line to which the vacuum is applied. This accepts line is connected to a relatively large degassing container that is likewise under vacuum. One of this kind contains both a liquid phase and a gas phase. Examples of this are shown by U.S. Pat. No. 4,443,232 A, U.S. Pat. No. 5,236,475 A, EP 1 273 697 A and DE 17 61 496. These plants are particularly expensive because of the large degassing container and need a lot of space.

SUMMARY OF THE INVENTION

The present invention is therefore to design plants of the type mentioned at the outset that are structured in a space-saving manner even with a large number of hydrocyclones and are less expensive than known solutions. Moreover, disruptive hydraulic impulses in the suspension fed to the headbox are to be avoided.

According to the invention, at least one accepts draining pipe is connected to the accepts lines and several accepts draining pipes open directly into a further line downstream.

The present invention is directed to a plant for cleaning and degassing a fibrous suspension. The plant includes a plurality of hydrocyclones, in which each hydrocyclone includes an intake connection, an accepts connection, and a rejects connection and at least two supply lines for feeding liquids into the plurality of hydrocyclones. At least two accepts lines, coupled to the accepts connections of the plurality of hydrocyclones, are structured and arranged to combine liquids cleaned of contaminants in the plurality of hydrocyclones, and at least one accepts draining pipe coupled to the at least two accepts lines is structured and arranged to open directly into a further line downstream.

In accordance with a feature of the invention, the rejects connections can be arranged to pass heavy material.

According to another feature of the instant invention, the further line downstream may include a collecting line and the at least one accepts draining pipe may include a plurality of accepts draining pipes being structured and arranged to open directly into the collecting line.

The further line downstream can include a pipe section coupled, on a downstream end relative to a flow direction, to a collecting line, and the at least one accepts draining pipe may include a plurality of accepts draining pipes structured and arranged to open directly into the pipe section.

According to still another feature of the invention, the at least two accepts lines can be placed under vacuum.

Adjacent accepts lines may be arranged parallel to one another and at a same geodetic height. Moreover, the further line downstream can include a collecting line, and a geodetic height difference between a center of the collecting line at its deepest point and a liquid level in the accepts lines is at least 5 m. Still further, the geodetic height difference can be at least 8 m.

The further line downstream may include a collecting line coupled to a pump that supplies a headbox of a paper machine with fibrous suspension.

Further, the further line downstream can include a collecting line, and a degassing container is not present between the accepts lines and the collecting line to separate a gas phase and a liquid phase.

According to a further feature of the instant invention, the accepts lines can include pipelines and the at least one accepts draining pipes may be coupled to an axial center of the pipelines.

In accordance with a still further feature of the present invention, the accepts connections of the plurality of hydrocyclones may be insertable into the accepts line from below.

Further still, the accepts connections of the plurality of hydrocyclones can be arranged to open into the accepts line above a liquid level.

In accordance with another feature of the invention, the at least one accepts draining pipes may include a plurality of accepts draining pipes that are arranged to have no connection to one another in which, in operation, an interface forms between a liquid and a gas above it.

The plurality of hydrocyclones can be connected in a multistage manner such that heavy material of a first stage can be fed to a second stage for cleaning. Moreover, the plant can include a device to continuously draw off the heavy material of the first stage.

The invention is directed to a process for cleaning and degassing a fibrous suspension, that includes supplying the fibrous suspension to a plurality of hydrocyclones, combining liquids cleaned of contaminants in the plurality of hydrocyclones in at least two accepts lines, and supplying the combined liquids from the at least two accepts lines to at least one accepts draining pipe, which is arranged to open directly into a further line downstream.

According to a feature of the invention, the further line downstream can include a collecting line and the combined liquids may be supplied directly into the collecting line.

Further, the further line downstream can include a pipe section coupled, on a downstream end relative to a flow direction, to a collecting line, and the combined liquids may be supplied directly into the pipe section.

The process can also include placing the at least two accepts lines under vacuum.

According to another feature of the instant invention, the further line downstream may include a collecting line and a liquid level of the cleaned liquid in the at least two accepts lines can be at least 5 m above a center of the collecting line at its deepest point. Further, the liquid level can be at least 8 m above the deepest point of the center of collecting line.

Moreover, the further line downstream can include a collecting line and the process can further include pumping the fibrous suspension from the collecting line to a headbox of a paper machine.

In accordance with still yet another feature of the present invention, the further line downstream can include a collecting line, and degassing of the fibrous suspension can be performed without a degassing container being present between the accepts lines and the collecting line.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
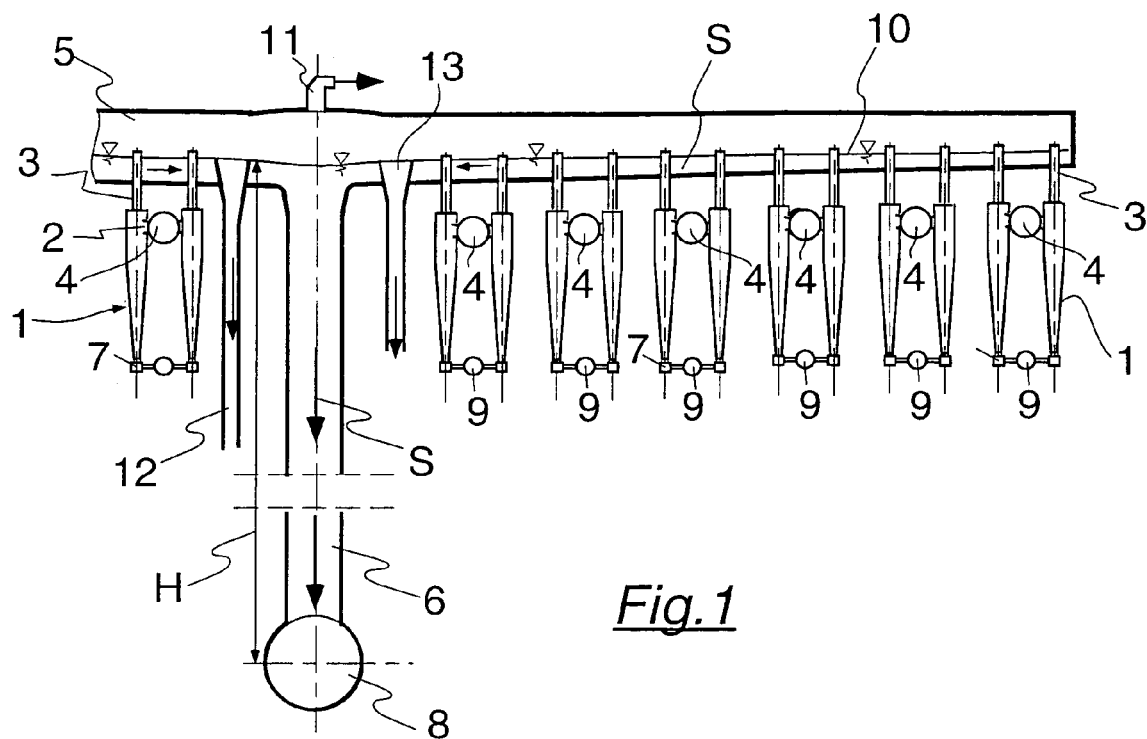
FIG. 1 illustrates a partial sectional view from the front of a part of hydrocyclone plant according to the instant invention.

The plant according to the invention shown only partially in FIG. 1 contains a large number of hydrocyclones 1 with respectively an intake connection 2, an accepts connection 3 and a rejects connection 7 for the eliminated heavy material. As a rule, hydrocyclones 1 used in such a plant are identical to one another. Accepts connections 3 of hydrocyclones 1 open into an accepts line 5 from below. Accepts line 5 is embodied or formed as an approximately horizontal pipeline, and, in an axial center and bottom of accepts line 5, an accepts draining pipe 6 is connected leading downward. In accepts line 5, fibrous suspension S forms an interface 10 to a gas chamber above, flows toward accepts draining pipe 6 and off through it. As is known per se with plants of this type, suitable overflow pipes 12 and 13 are used to maintain the level and to draw off the parts floating on the surface of fibrous suspension S. The particular advantage here is that the surface waves in interface 10 are drawn off through overflow pipes 12 and 13. Otherwise, these surface waves could lead to troublesome pressure impulses in the stock/water system in the suspension stream flowing through accepts draining pipe 6 and, thus, in the paper machine. Accepts draining pipe 6 is used to draw off deaerated fibrous suspension S into collecting line 8 (which lies much lower). It is drawn with a dashed line and can be relatively long, preferably bridging a height difference H of over 5 m, so that the pressure does not get too low in collecting line 8. This could otherwise lead to problems with pump 15 connected thereto (see FIG. 3).

The accepts lines are placed under vacuum in a manner known per se through a gas suction 11, such that the suspension located therein comes to a boil. This is well known to be an effective way of removing the gases contained therein, in particular air.

Figure 2:
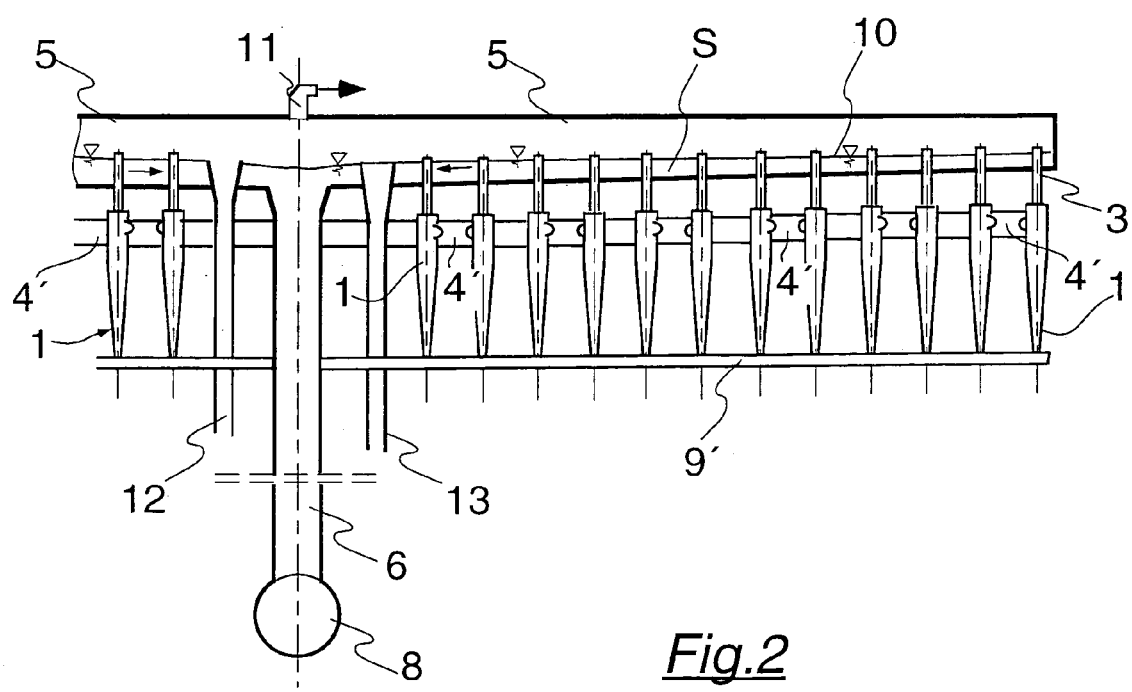
FIG. 2 illustrates a variant of the invention depicted in FIG. 1.

The feed of fibrous suspension to the individual hydrocyclones takes place via a number of horizontal supply lines 4 that are arranged in the embodiment shown in FIG. 1 at right angles to the longitudinal extension of accepts line 5. Such an arrangement can be advantageous with the customary space conditions. However, it is also possible, as shown in FIG. 2, to align supply lines 4' parallel to the longitudinal extension of accepts lines 5. The heavy material is collected and drawn off through reject lines 9 according to FIG. 1 or reject lines 9' according to FIG. 2. In multistage hydrocyclone plants, as a rule, the heavy material of a first stage is collected and fed into the intake of the subsequent second stage. Hydrocyclone plants according to the invention can also be advantageous with circuits of this type.

Figure 3:
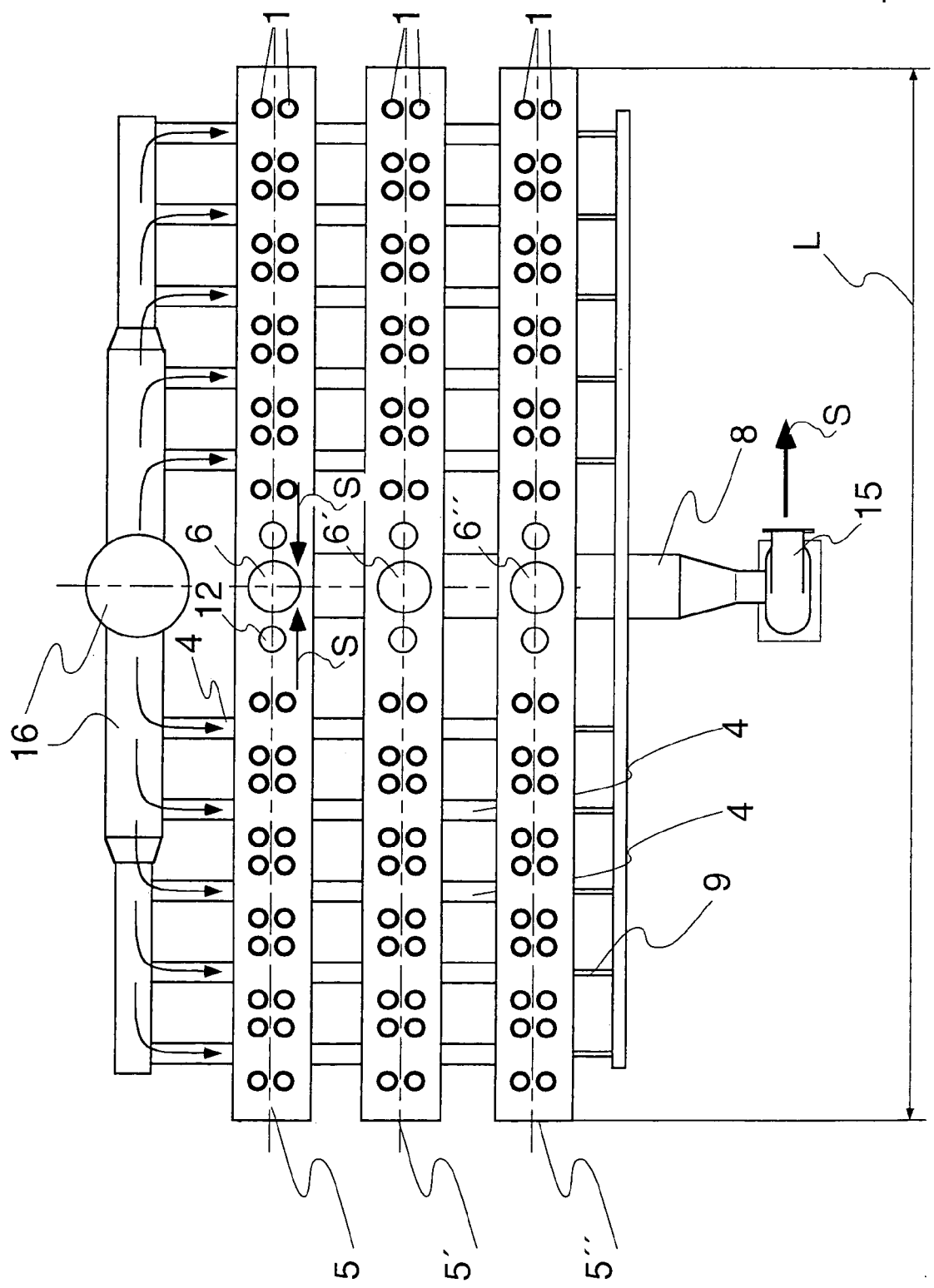
FIG. 3 illustrates a view from above of a part of a hydrocyclone plant according to the instant invention.

FIG. 3 shows a hydrocyclone plant in which the fibrous suspension fed through a pipe system 16 is fed first to a number of several supply lines 4 lying parallel and then to hydrocyclones 1. This plant contains a total of three accepts lines 5 or 5' or 5" that are arranged at a same geodetic height and parallel to one another. Each of these accepts lines is provided in its axial center with an accepts draining pipe 6 or 6' or 6", whereby these accepts draining pipes open into the same collecting line 8. Collecting line 8 can be directly connected to the intake pipe of a pump 15 that supplies the headbox of a paper machine (not shown) with the fibrous suspension needed for paper production.

It has proven to be favorable to embody or form the accepts line as a pipe with a diameter of approx. 1200 mm and a length L of approx. 18 m. Applied to a typical example (volume throughput 108,000 l/min, three accepts lines, 120 hydrocyclones) this means an average dwell time of the suspension in the accepts line of approx. 17 sec at a maximum flow speed of approx. 0.53 m/sec. Advantageously, the diameter of the accepts draining pipe can be selected to be 800 mm and that of the overflow pipes to be 300 mm.

There are different possibilities for connecting the accepts draining pipes to the collecting lines preferably lying much lower or partially leading lower. Whereas, according to FIGS. 1 through 3, each accepts draining pipe 6 or 6' or 6" is guided separately down to a low-lying collecting line 8, there is also the possibility (see FIG. 4) of already combining the accepts coming from several accepts lines 5 or 5' or 5" at a higher level in a connecting pipe section 17. Thus, accepts lines 5 or 5' or 5" are coupled via shorter accepts draining pipes 18 or 18' or 18" and then discharging them in a collecting line 8' running over most of the height difference H. In operation, pipe section 17 is completely filled with liquid, thus does not form an interface 10 as is present in accepts lines 5 or 5' or 5". Which, thus, differs essentially from a known degassing container. Pipe section 17 is advantageously embodied or formed conically with a cross section widening in the flow direction. Furthermore, it is advantageous to select a slanting arrangement, e.g., 15 to 30 degrees to the horizontal.

Figure 4:
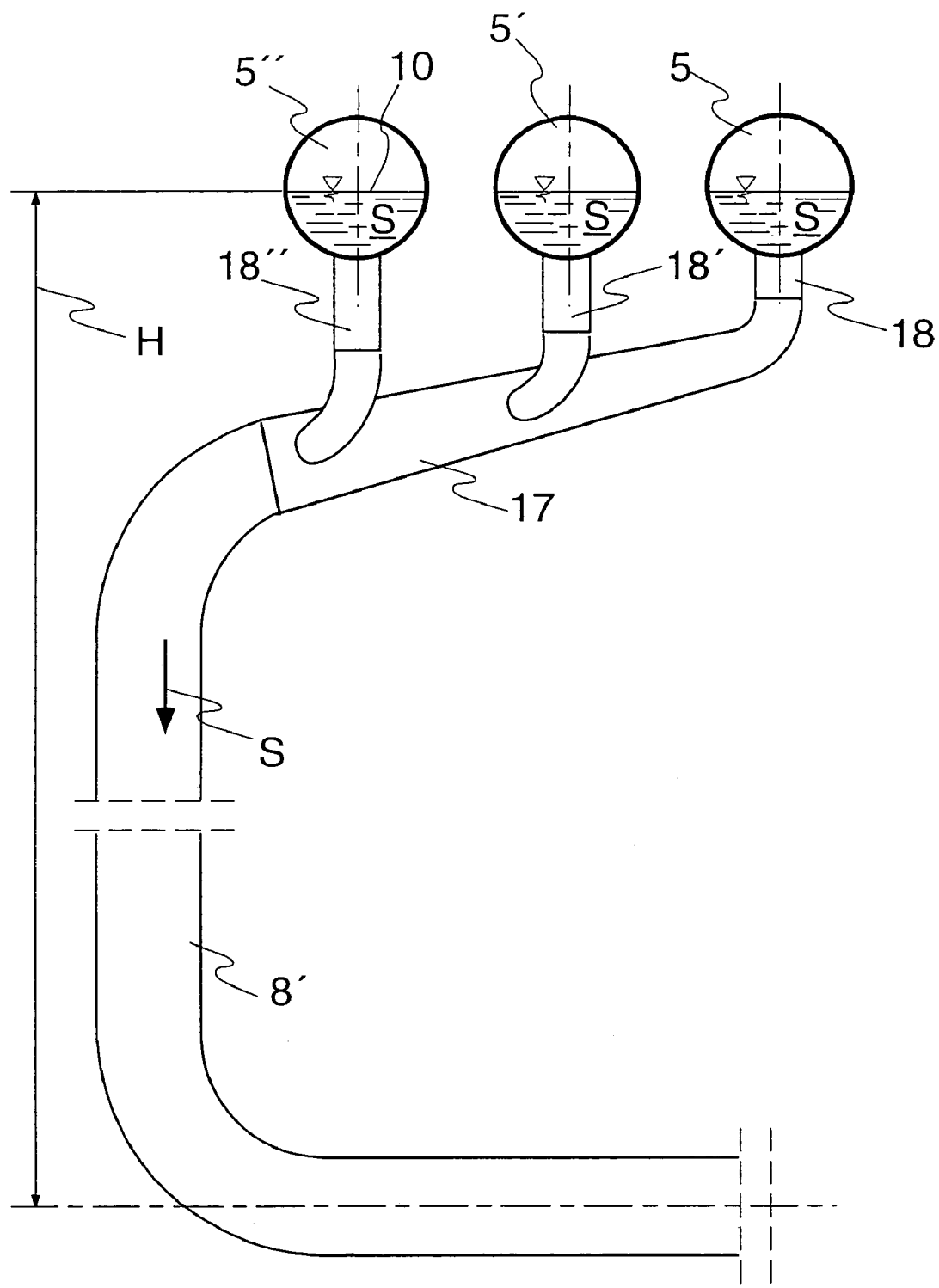
FIG. 4 illustrates a variant of the invention in which accepts are combined at a higher level

FIG. 4 is drawn in a very simplified manner, thus, e.g., the hydrocyclones and their connections are not illustrated.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A plant for cleaning and degassing a fibrous suspension comprising:
    a plurality of hydrocyclones, in which each hydrocyclone includes an intake connection, an accepts connection, and a rejects connection;
    at least two supply lines for feeding liquids into said plurality of hydrocyclones;
    at least two accepts lines, coupled to said accepts connections of said plurality of hydrocyclones, being structured and arranged to combine liquids cleaned of contaminants in said plurality of hydrocyclones; and
    at least one accepts draining pipe coupled to said at least two accepts lines being structured and arranged to open directly into a further line downstream.

2. The plant in accordance with claim 1, wherein said rejects connections are arranged to pass heavy material.

3. The plant in accordance with claim 1, wherein said further line downstream comprises a collecting line and said at least one accepts draining pipe comprises a plurality of accepts draining pipes being structured and arranged to open directly into said collecting line.

4. The plant in accordance with claim 1, wherein said further line downstream comprises a pipe section coupled, on a downstream end relative to a flow direction, to a collecting line, and said at least one accepts draining pipe comprises a plurality of accepts draining pipes being structured and arranged to open directly into said pipe section.

5. The plant in accordance with claim 1, wherein said at least two accepts lines are placed under vacuum.

6. The plant in accordance with claim 1, wherein adjacent accepts lines are arranged parallel to one another and at a same geodetic height.

7. The plant in accordance with claim 6, wherein said further line downstream comprises a collecting line, and a geodetic height difference between a center of said collecting line at its deepest point and a liquid level in said accepts lines is at least 5 m.

8. The plant in accordance with claim 7, wherein the geodetic height difference is at least 8 m.

9. The plant in accordance with claim 1, wherein said further line downstream comprises a collecting line coupled to a pump that supplies a headbox of a paper machine with fibrous suspension.

10. The plant in accordance with claim 1, wherein said further line downstream comprises a collecting line, and a degassing container is not present between said accepts lines and said collecting line to separate a gas phase and a liquid phase.

11. The plant in accordance with claim 1, wherein said accepts lines comprise pipelines and said at least one accepts draining pipes are coupled to an axial center of said pipelines.

12. The plant in accordance with claim 1, wherein said accepts connections of said plurality of hydrocyclones are insertable into said accepts line from below.

13. The plant in accordance with claim 1, wherein said accepts connections of said plurality of hydrocyclones are arranged to open into said accepts line above a liquid level.

14. The plant in accordance with claim 1, wherein said at least one accepts draining pipes comprise a plurality of accepts draining pipes that are arranged to have no connection to one another in which, in operation, an interface forms between a liquid and a gas above it.

15. The plant in accordance with claim 1, wherein said plurality of hydrocyclones are connected in a multistage manner such that heavy material of a first stage is fed to a second stage for cleaning.

16. The plant in accordance with claim 15, further comprising a device to continuously draw off the heavy material of said first stage.

17. A process for cleaning and degassing a fibrous suspension, comprising:
    supplying the fibrous suspension to a plurality of hydrocyclones;
    combining liquids cleaned of contaminants in the plurality of hydrocyclones in at least two accepts lines connected to the plurality of hydrocyclones; and
    supplying the combined liquids from the at least two accepts lines to at least one accepts draining pipe, which is connected to the at least two accepts lines and arranged to open directly into a further line downstream.

18. The process in accordance with claim 17, wherein the further line downstream comprises a collecting line and the combined liquids are supplied directly into the collecting line.

19. The process in accordance with claim 17, wherein the further line downstream comprises a pipe section coupled, on a downstream end relative to a flow direction, to a collecting line, and the combined liquids are supplied directly into said pipe section.

20. The process in accordance with claim 17, further comprising placing the at least two accepts lines under vacuum.

21. The process in accordance with claim 17, wherein the further line downstream comprises a collecting line and a liquid level of the cleaned liquid in the at least two accepts lines is at least 5 m above a center of the collecting line at its deepest point.

22. The process in accordance with claim 21, wherein the liquid level is at least 8 m above the deepest point of the center of collecting line.

23. The process in accordance with claim 17, wherein said further line downstream comprises a collecting line and said process further comprises pumping the fibrous suspension from the collecting line to a headbox of a paper machine.

24. The process in accordance with claim 17, wherein the further line downstream comprises a collecting line, and degassing of the fibrous suspension is performed without a degassing container being present between the accepts lines and the collecting line.

* * * * *